US005801309A

United States Patent [19]
Carr et al.

[11] Patent Number: 5,801,309
[45] Date of Patent: Sep. 1, 1998

[54] MICROACCELEROMETER EMPLOYING RESONANT CIRCUIT DETECTION OF SEISMIC MASS DISPLACEMENT

[75] Inventors: William N. Carr, Wayne, N.J.; Dong-Il Cho, Seoul, Rep. of Korea

[73] Assignees: New Jersey Institute of Technology, Newark; Princeton University, Princeton, both of N.J.

[21] Appl. No.: 565,325

[22] Filed: Nov. 30, 1995

Related U.S. Application Data

[63] Continuation of Ser. No. 210,696, Mar. 18, 1994, abandoned.

[51] Int. Cl.$^6$ ............................................. G01P 15/10
[52] U.S. Cl. ........................................... 73/514.29
[58] Field of Search ..................... 73/514.29, 514.16, 73/514.17, 514.18, 514.32, 514.33, 514.35; 310/329

[56] References Cited

U.S. PATENT DOCUMENTS

| | | | |
|---|---|---|---|
| 3,221,563 | 12/1965 | Wing | 73/514.18 |
| 3,479,536 | 11/1969 | Norris | 73/517 AV |
| 3,505,866 | 4/1970 | Weisbord et al. | 73/517 AV |
| 3,566,692 | 3/1971 | Bock et al. | 73/517 AV |
| 4,430,895 | 2/1984 | Colton | 73/497 |
| 4,479,385 | 10/1984 | Koehler | 73/517 AV |
| 4,553,436 | 11/1985 | Hansson | 73/517 |
| 4,598,585 | 7/1986 | Boxenhorn | 73/505 |
| 4,805,456 | 2/1989 | Howe et al. | 73/517 |
| 4,945,765 | 8/1990 | Roszhart | 73/514.29 |
| 5,006,487 | 4/1991 | Stokes | 437/228 |
| 5,015,906 | 5/1991 | Cho et al. | 310/309 |
| 5,060,504 | 10/1991 | White et al. | 73/1 |
| 5,187,399 | 2/1993 | Carr et al. | 310/40 |

OTHER PUBLICATIONS

Solid–State Sensor and Actuator Workshop, 1990 Hilton Head Island, South Carolina Jun. 4–7 pp. 153–157.
Spin–On–Glass for Surface Planarization and as a Sacrificial Film for Surface Microengineering New Jersey Institute of Technology, Microelectronnics Research Center, 323 King Blvd., Newark, N.J. Proc. 2nd Int'l Conf. on Elec. Mats. 1990 Materials Research Scoiety.

(List continued on next page.)

*Primary Examiner*—Hezron E. Williams
*Assistant Examiner*—Helen C. Kwok
*Attorney, Agent, or Firm*—Ohlandt, Greeley, Ruggiero & Perle

[57] ABSTRACT

A first embodiment of an improved microaccelerometer includes a seismic mass, a support wafer, a cover wafer and a beam (or beams) for flexibly mounting a seismic mass between the support and cover wafers. A first oscillator includes a resonant circuit whose capacitance comprises conductive plates on one surface of the seismic mass and a conductive coating on an opposed surface of the support wafer. A second oscillator includes a resonant circuit whose capacitance is comprised of conductive coatings on another surface of the seismic mass and on an opposed surface of the cover wafer. A difference circuit provides an acceleration output that is dependent on a difference in oscillation frequencies between the first and second oscillators, when the accelerometer is subjected to an acceleration event. A second embodiment includes a structure similar to the aforedescribed, however, the second oscillator is replaced by an ac levitation circuit that exerts a single direction restoring force on the seismic mass during an acceleration event. A third embodiment provides ac levitational restoring forces when the seismic mass is subject to acceleration in either of two opposed directions. In the latter embodiment, ac levitating circuits are disposed on opposed surfaces of the support and cover wafers.

4 Claims, 8 Drawing Sheets

OTHER PUBLICATIONS

Experimental Study of Electric Suspension for Microbearings, Suresh Kumar, Dan Cho, Member, IEEEE and William N. Carr, Journal of Microelectromechanical Systems, vol. 1., No. 1., Mar. 1992, pp. 23–30.

Micromechanical Accelerometer Intergrated with MOS Detection Circuitry, Kurt E. Petersen, Anne Shartel and Norman F. Raley, Studen Member, IEEE, pp. 24–27.

Micro Electro Mechanical Systems, W. Benecke –HC Petzold (Eds.), Travemunde, Germany, Feb. 4 –Feb. 7, 1992 IEEE Catalog No. 92CH3093–2.

Smart Sensors, J. Micromech, Microeng. 1 (1991) 86–102, Printed in UK, Khalil Najafi, pp. 86–107.

Transducers '87, The 4th International Conference on Solid–State Sensors and Actuators, Digest of Technical Papers, pp. 398–402.

Experimental Study of Electric Suspension for Microbearings, Suresh Kumar, Dan Sho and William Carr, Journal of Microelectromechanical Systems, vol. 1, No. 1, Mar., 1992.

Micromachined Silicon Resonators, Terry V. Roszhart, Electro International Electronics Conference and Exposition Apr. 16–18, 1991/New York, New York, pp. 1–6.

MICROACCELEROMETER EMPLOYING RESONANT CIRCUIT DETECTION OF SEISMIC MASS DISPLACEMENT

This is a continuation of Ser. No. 08/210,696 filed Mar. 18, 1994, now abandoned.

FIELD OF THE INVENTION

This invention relates to microaccelerometer structures and, more particularly, to a microaccelerometer that employs resonant oscillating circuits to determine a physical displacement of a seismic mass within the microaccelerometer structure.

BACKGROUND OF THE INVENTION

Prior art microaccelerometers often employ a seismic mass that is cantilevered on one or more support beams. The seismic mass is displaced generally normal to the direction of beam extension by an accelerating force. To measure the amount of accelerating force, strain gauges are often embedded in the beam or beams which support the seismic mass and are connected to a bridge circuit to obtain an output proportional to an amount of seismic mass displacement. U.S. Pat. No. 5,060,504 to White et al., discloses such a microaccelerometer. White et al. further employ a conductive coating on one surface of the seismic mass and a similar coating on an adjacent fixed surface to enable application of a dc voltage therebetween. A resulting electrostatic field is established between the seismic mass and the adjacent fixed surface which tends to restore the mass to a null position. Those skilled in the art will realize that positioning through use of applied dc potentials to create electrostatic forces is inherently unstable (i.e., as a result of drift, voltage variations, etc.).

U.S. Pat. No. 4,805,456 to Howe et al. discloses a resonant accelerometer which employs drive electrodes positioned adjacent a beam (or beams) supporting a seismic mass. The beams are mechanically resonant and are electrostatically excited to resonate by pulses applied to the drive electrodes. As the beams are stressed, their resonant frequencies change, which changes are sensed to determine the amount of seismic mass displacement. Howe et al. employ a counter or a phase locked loop to detect the frequency of oscillation of each beam and then provide a frequency difference (as measured between beams along a common axis) as an indication of acceleration. The frequency difference is achieved by converting each frequency signal into a voltage which is then applied to control a measuring circuit. Howe et al. further describe (FIG. 10) the use of dc electrostatic potentials to enable a repositioning of their seismic mass. More recently, Cho et al. (U.S. Pat. No. 5,015,906) and Carr et al. (U.S. Pat. No. 5,187,399) have disclosed an ac stabilization procedure for a seismic mass which avoids instabilities inherent in dc levitated systems. In an ac levitation system, a planar rotor having a conductive surface is displaced above (or below) a pair of planar conductive levitation plates that are disposed on an adjacent fixed surface. A high frequency voltage source is connected across the conductive plates so as to create a continuous ac circuit from the one side of an ac voltage source through an inductor to one of the levitation plates, to the conductive surface on the rotor, back to the other levitation plate and the other side of the ac voltage source. The resulting ac circuit exhibits a natural frequency of resonance. The ac voltage source is chosen to have a frequency of excitation that is in excess of the natural frequency of resonance of the ac circuit.

In operation, when the ac voltage source is energized, the rotor structure is held in vertical equilibrium in relation to the fixed surface that supports the levitation plates. Stability of levitation comes about because the net forces acting on the rotor, when it is displaced from its equilibrium position, are restoring. More specifically, an upward displacement of the rotor produces a net downward force and vice versa. That is, the oscillating force field acting on the rotor acts to oppose displacement movements. The rotor therefore experiences a net restoring force that is essentially a null at some levitation position.

This phenomenon is further described by Kumar et al. in "Experimental Study of Electric Suspension for Microbearings", JOURNAL OF MICROELECTROMECHANICAL SYSTEMS, Vol. 1, No. 1, March 1992, pages 23–30.

Accordingly, it is an object of this invention to provide an improved microaccelerometer that exhibits improved sensing of the deflection of a seismic mass.

It is another object of this invention, to provide an improved microaccelerometer that employs ac levitation to achieve an adjustability of acceleration outputs.

It is yet another object of this invention to provide an improved microaccelerometer wherein ac levitation is employed in a feedback circuit to restore a positionally displaced seismic mass to a null position.

SUMMARY OF THE INVENTION

A first embodiment of an improved microaccelerometer includes a seismic mass, a support wafer, a cover wafer and a beam (or beams) for flexibly mounting a seismic mass between the support and cover wafers. A first oscillator includes a resonant circuit whose capacitance comprises conductive plates on one surface of the seismic mass and a conductive coating on an opposed surface of the support wafer. A second oscillator includes a resonant circuit whose capacitance is comprised of conductive coatings on another surface of the seismic mass and on an opposed surface of the cover wafer. A difference circuit provides an acceleration output that is dependent on a difference in oscillation frequencies between the first and second oscillators, when the accelerometer is subjected to an acceleration event. A second embodiment includes a structure similar to the aforedescribed, however, the second oscillator is replaced by an ac levitation circuit that exerts a single direction restoring force on the seismic mass during an acceleration event. A third embodiment provides ac levitational restoring forces when the seismic mass is subject to acceleration in either of two opposed directions. In the latter embodiment, ac levitating circuits are disposed on opposed surfaces of the support and cover wafers.

DETAILED DESCRIPTION OF THE INVENTION

Figure 1:
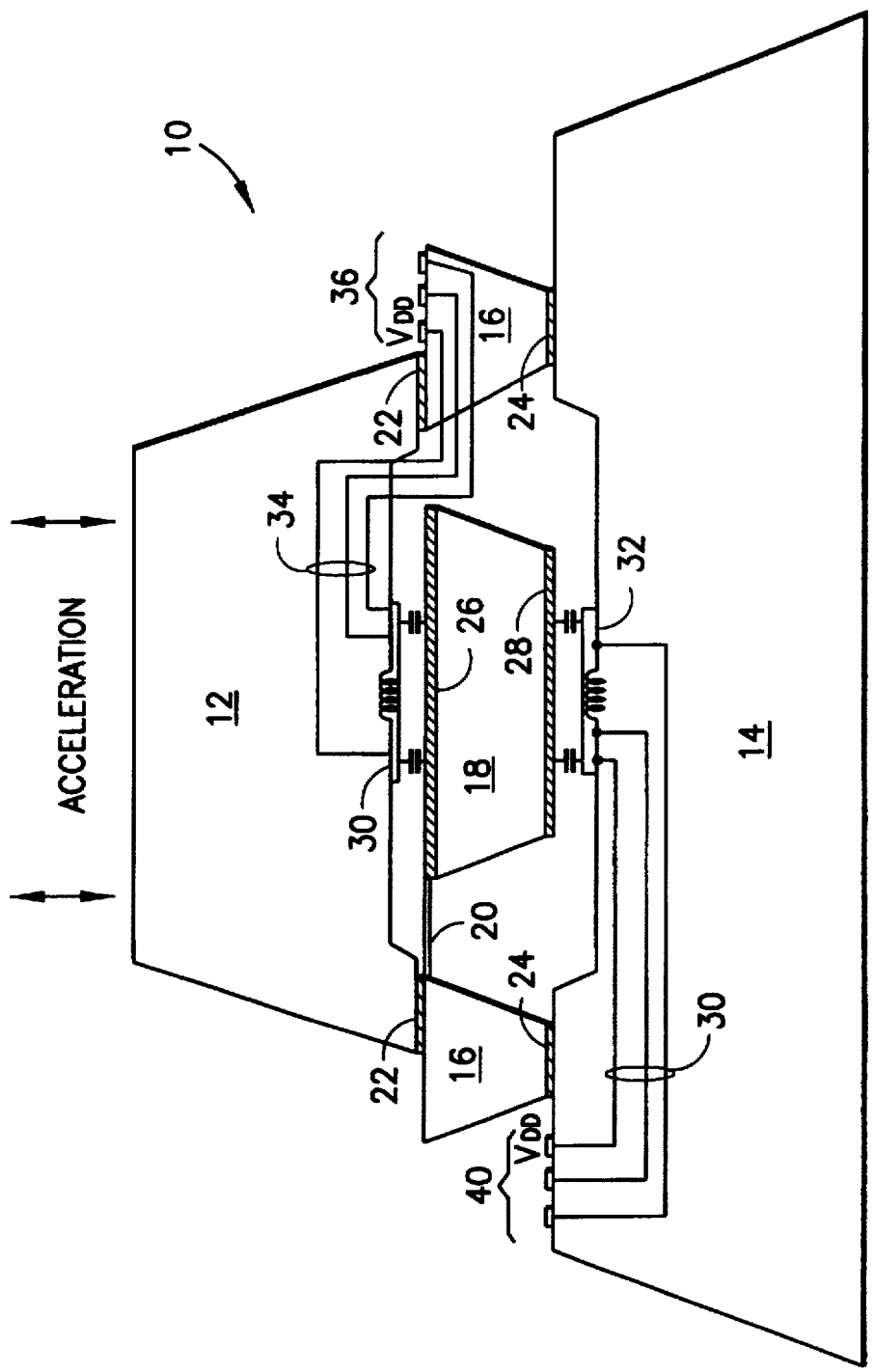
FIG. 1 is a cross sectional view of a first embodiment of a microaccelerometer constructed in accordance with the invention.

Referring to FIG. 1, a microaccelerometer 10 includes a cover wafer 12, a support wafer 14, and a frame 16. A seismic mass 18 is supported by a beam 20 that extends from frame 16. Cover wafer 12 is bonded to frame 16 by glass seals 22 and frame 16 is, in turn, bonded to support wafer 14 by glass seals 24. Each of cover wafer 12, support wafer 14, and frame 16 are comprised of silicon (or gallium arsenide and compounds thereof) and are constructed using known photolithographic procedures.

A conductive layer 26 is present on the uppermost surface of seismic mass 18 and a conductive layer 28 is present on the lowermost surface thereof. An insulating layer (not shown) separates conductive layers 26 and 28 from the silicon body of seismic means 18.

A semiconductor chip 30 is mounted on the lowermost surface of cover wafer 12 and an identical semiconductor chip 32 is located on the uppermost surface of support wafer 14. An inductor is schematically shown with each of chips 30 and 32 to indicate that each of those chips contains an inductor. Conductors 34 are shown schematically and enable connections to be made between semiconductor chip 30 and bonding pads 36. Similarly, schematically shown conductors 38 enable electrical connections to be made between semiconductor chip 32 and bonding pads 40. The circuits on semiconductor chips 30 and 32 can also be processed, in their entirety or partially, using standard integrated circuit and micromachining directly on cover and support wafers 12 and 14.

Figure 2:
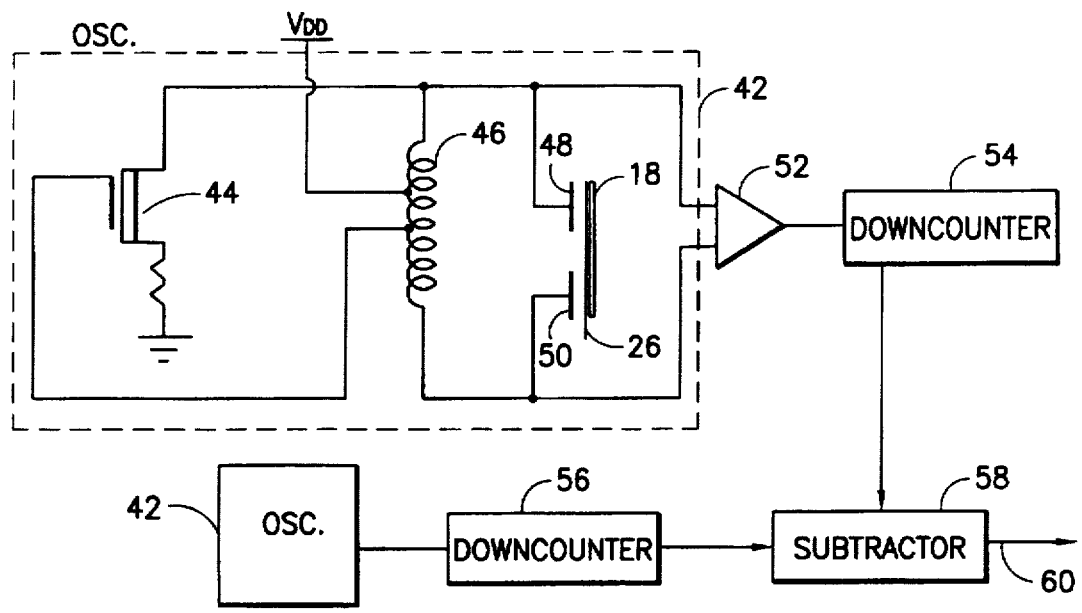
FIG. 2 is a circuit diagram illustrating oscillator circuits employed in the microaccelerometer of FIG. 1.

Each of semiconductor chips 30 and 32 includes a Hartley oscillator circuit 42 as shown in FIG. 2. Hartley oscillator circuit 42 comprises an FET transistor 44 that is connected to a resonant circuit which comprises inductor 46 and capacitor plates 48 and 50. The opposed plate of the capacitors is conductive layer 26 on seismic mass 18 (see FIG. 1). When seismic mass 18 is positionally displaced by an acceleration event, the frequency across the resonant circuit of oscillator 42 will change. That frequency is fed through a buffer amplifier 52 to a downcounter 54. An identical oscillator 42 is included on chip 32 and provides its frequency output to downcounter 56.

Each of downcounters 54 and 56 count down by a given number of counts and then recommence their countdown operation. The difference between each set of counts is detected by a subtractor 58 which provides a difference output on line 60. That output is indicative of an amount of deflection of seismic mass 18. For example, in the event an acceleration moves microaccelerometer 10 in an upward direction, conductive layer 26 moves away from capacitor plates 48 and 50 in oscillator 42 on chip 30. By contrast, conductive layer 28 moves closer to capacitor plates 48 and 50 on chip 32. As a result, the oscillation frequencies of oscillators 42 on chips 30 and 32 are oppositely affected, causing the down count values fed to subtractor 58 to exhibit a differential value that is directly related to the frequency difference between the two oscillator frequencies. Subtractor 58 provides an output indicative of that differential value as a measurement of acceleration.

Figure 3:
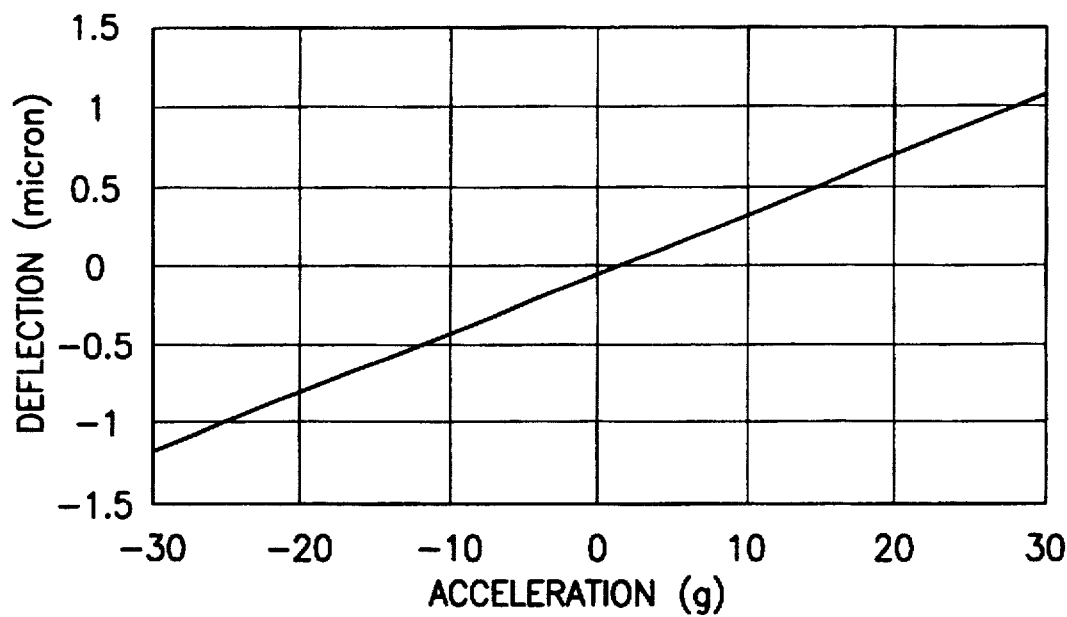
FIG. 3 is a plot of acceleration versus deflection for the microaccelerometer of FIG. 1.
Figure 4:
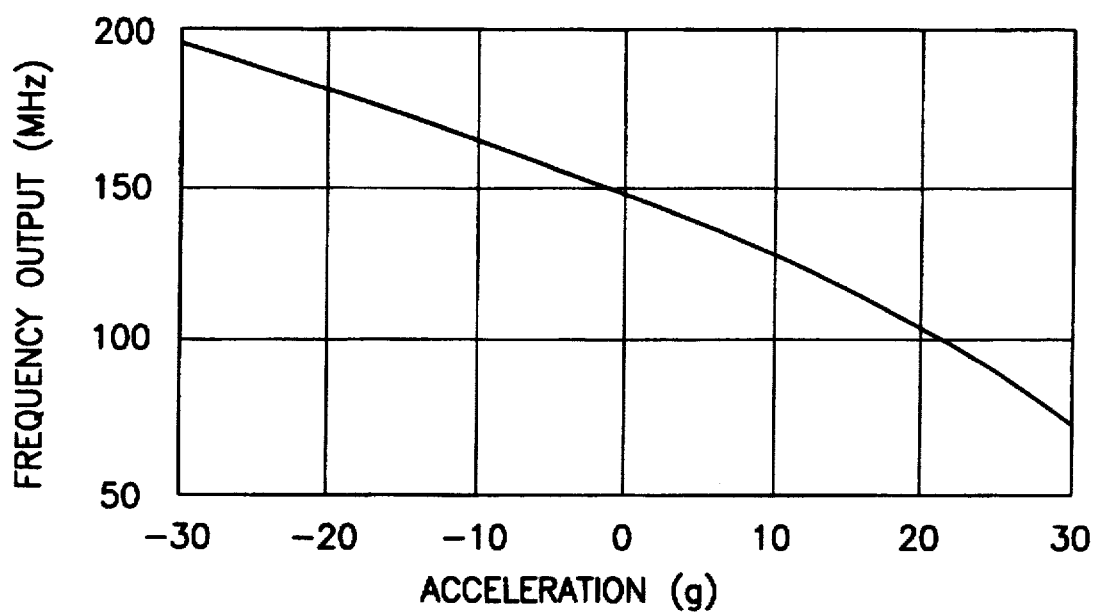
FIG. 4 is a plot of acceleration versus frequency for the microaccelerometer of FIG. 1.

FIG. 3 is a plot of acceleration versus deflection and FIG. 4 is a plot of acceleration versus frequency output, both for a model of the structure shown in FIG. 1. The model of the structure of FIG. 1 was derived employing the following device parameters:

width of beam $20=800\times 10^{-6}$m thickness of beam $20=30\times 10^{-6}$m length of beam $20=2000\times 10^{-6}$m width of seismic mass $18=3000\times 10^{-6}$m thickness of seismic mass $18=200\times 10^{-6}$m length of seismic mass $18=400\times 10^{-6}$m nominal gap=$1.5\times 10^{-6}$m.

Figure 5:
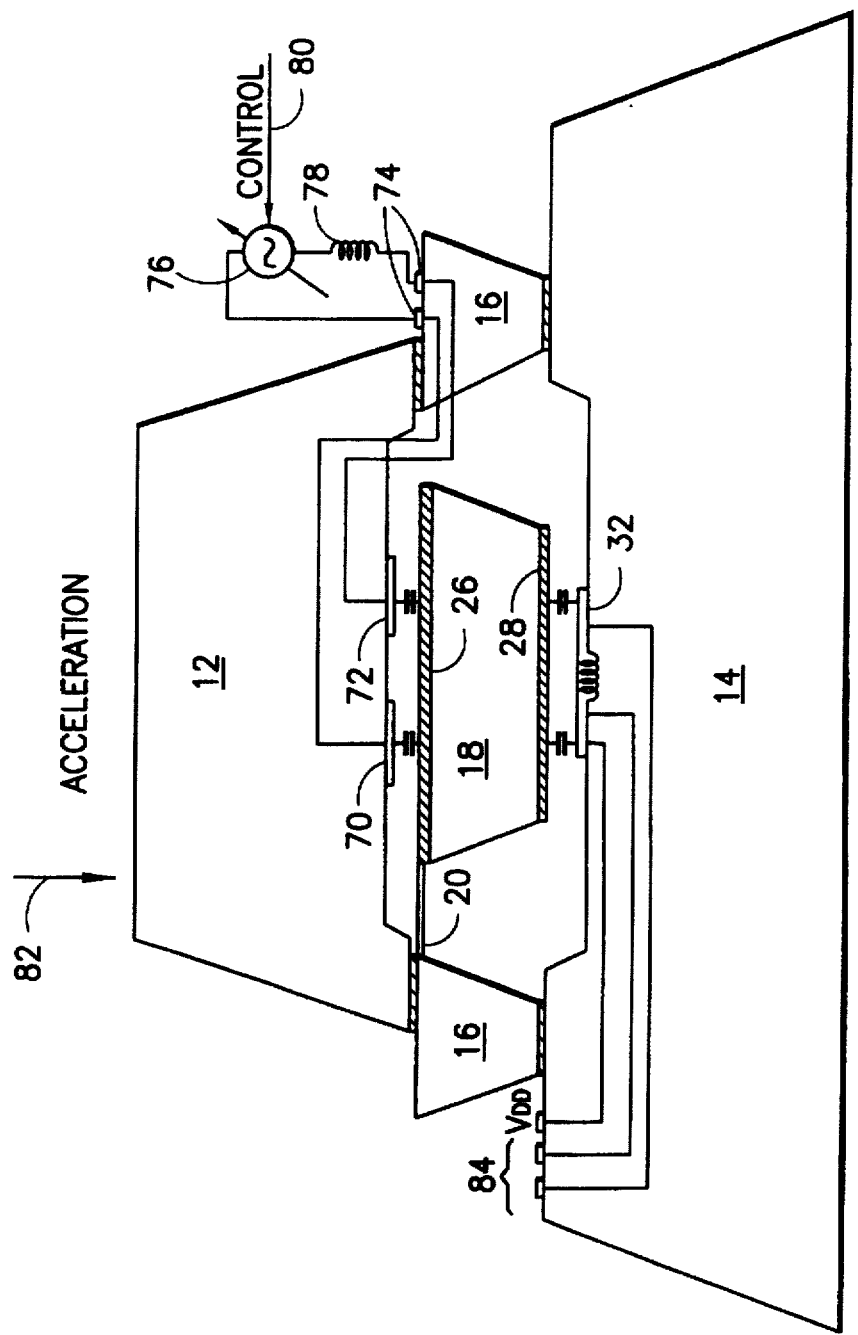
FIG. 5 is a sectional view of a further embodiment of a microaccelerometer that employs ac levitation.

The physical/material constants used in the modeling were as follows:

$\mu=1.8\times 10^{-5}$ Ns/m$^2$ =viscosity $\rho=2.3\times 10^3$ Kg/m$^3$ =density $e=180\times 10^9$ N/m$^2$ =modulus of elasticity $g=9.81$ m/sec$^2$ =unit gravity $\epsilon=8.85\times 10^{-12}$ F/m=permittivity FIG. 5 illustrates the microaccelerometer structure of FIG. 1 (like portions are numbered identically) that has been modified to include ac levitation. The structure of FIG. 1 has been changed by the removing oscillator chip 30 from the lowermost surface of cover wafer 12 and placing thereon of a pair of conductive levitation plates 70 and 72 that are insulated from the silicon (or gallium arsenide) body of cover wafer 12. Levitation plates 70 and 72 are connected via conductors through bonding pads 74 to a levitating ac source 76 and an inductor 78.

As taught in U.S. Pat. No. 5,015,906, the entire circuit connected to ac source 76 has a natural resonant frequency. The frequency of ac source 76 is selected to exceed that natural resonant frequency so as to achieve a stable levitation of seismic mass 18. A control input 80 enables alteration of the signals emanating from ac source 76 so as to achieve a repositioning of seismic mass 18 during an acceleration event.

Levitating plates 70 and 72, in combination with conductive layer 26, provide a levitating force that is attractive to seismic mass 18. As a result, the microaccelerometer of FIG. 5 is constructed for use wherein the acceleration force is as shown by arrow 82. Such acceleration causes a downward movement of seismic mass 18 (as constrained by beam 20), with the ac levitating circuit tending to return seismic mass 18 to a null position as a result of a compensating feedback control signal applied to control line 80.

Figure 6:
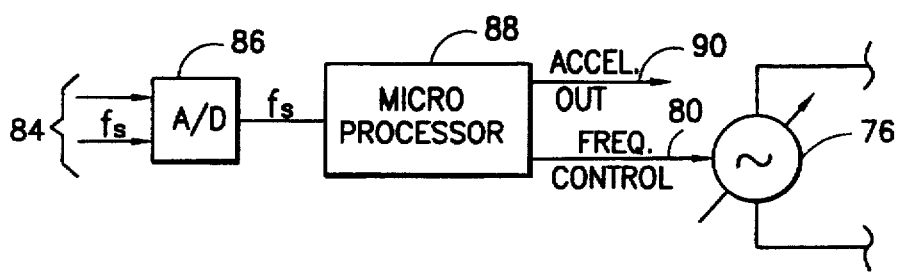
FIG. 6 is a feedback control circuit employed with the microaccelerometer of FIG. 5.
Figure 7:
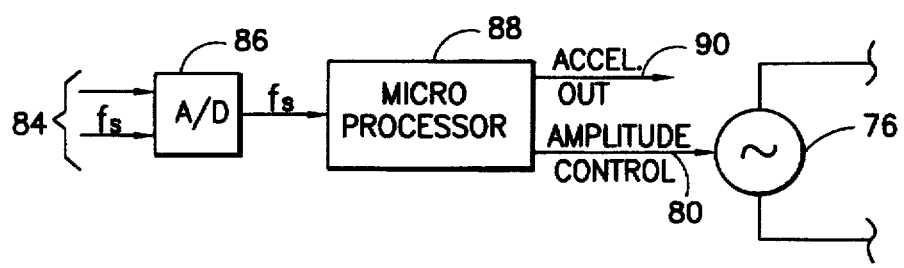
FIG. 7 is a further feedback circuit employed with the microaccelerometer of FIG. 5.

Control circuits which enable alteration of the ac levitation force are shown in FIGS. 6 and 7. Input to the control circuit of FIG. 6 is derived from the Hartley oscillator 42 present on semiconductor chip 32. The output signal frequency $f_s$ of oscillator 42 is fed from chip 32 to bonding pads 84. Signal frequency $f_s$ is then fed to analog/digital convertor 86 which provides digital voltage values to microprocessor 88 (at the frequency $f_r$). Microprocessor 88 detects any change in $f_r$ from a nominal frequency that is expected from Hartley oscillator 42 on chip 32, and employ the frequency difference to provide an acceleration output value on line 90. Furthermore, that frequency difference value is used to derive a frequency control signal that is fed, via control line 80, to ac source 76. The frequency of ac source 76 is decreased by the fed back control signal (causing a reduction in the induced attractive force) and enabling beam 20 (and seismic mass 18) to return towards a null position. Eventually frequency $f_r$ becomes equal to the nominal frequency of Hartley oscillator 42 when seismic mass 18 is at the null position.

This operation can be more fully understood by realizing that levitating plates 70 and 72, in combination with conductive layer 26, exhibit an attractive force on seismic mass 18 that is opposed by the stiffness of beam 20. When the structure shown in FIG. 5 accelerates in a downward direction, the distance between levitating plates 70 and 72 and conductive layer 26 decreases. By decreasing the frequency applied to levitating plates 70 and 72 from ac source 76, the resulting attractive force is decreased and enables beam 20 to return seismic mass 18 to an approximate null position. The frequency of oscillation of oscillator 42 on chip 32 provides the signal feedback that enables the restoration of seismic mass 18 to a null position.

The speed of operation of the restorative action is dependent upon the time constant of the feedback circuit, which time constant may be adjusted to achieve a desired speed of restoration. Such a null mode of operation of the microaccelerometer provides a highly accurate measure of acceleration in the direction shown by arrow 82, while preventing anomalies that occur in non-null mode accelerometers.

In FIG. 7, a similar feedback circuit is shown, however, there microprocessor 88 provides an amplitude control signal on line 80 that is proportional to the difference between feedback frequency $f_r$ and the nominal frequency of oscillator 42 on chip 32. As a result, the amplitude of oscillations emanating from ac source 76 are reduced thereby reducing the attractive force exerted on seismic mass 18 (much the same as above described).

The microaccelerometer as shown in FIG. 5 has been modeled using the same parameters as for the microaccelerometer shown in FIG. 1 except for physical dimensions, which were altered for minimal mechanical support as follows:

width of beam $20 = 50 \times 10^{-6}$m thickness of beam $20 = 10 \times 10^{-6}$m length of beam $20 = 500 \times 10^{-6}$m width of seismic mass $18 = 1000 \times 10^{-6}$m thickness of seismic mass $18 = 200 \times 10^{-6}$m length of seismic mass $18 = 2000 \times 10^{-6}$m.

Figure 8:
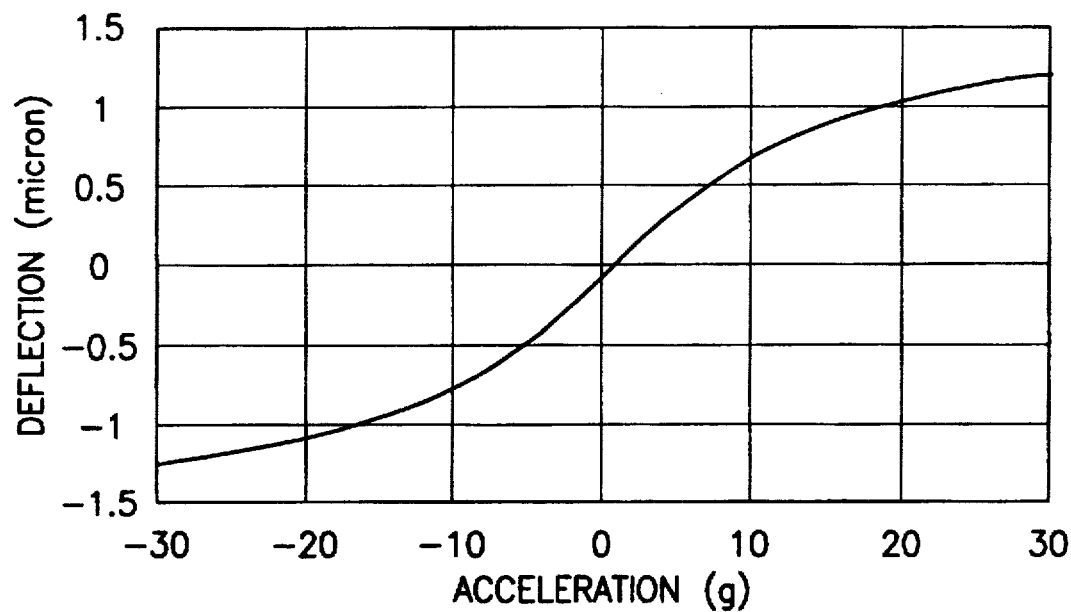
FIG. 8 is a plot of acceleration versus deflection for the microaccelerometer of FIG. 5.
Figure 9:
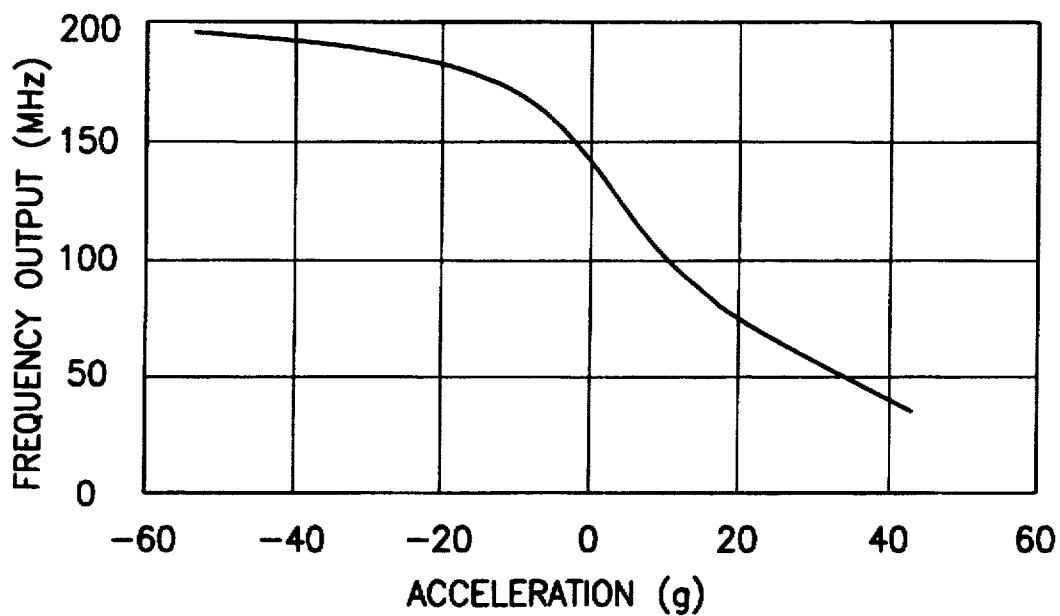
FIG. 9 is a plot of acceleration versus frequency for the microaccelerometer of FIG. 5.
Figure 10:
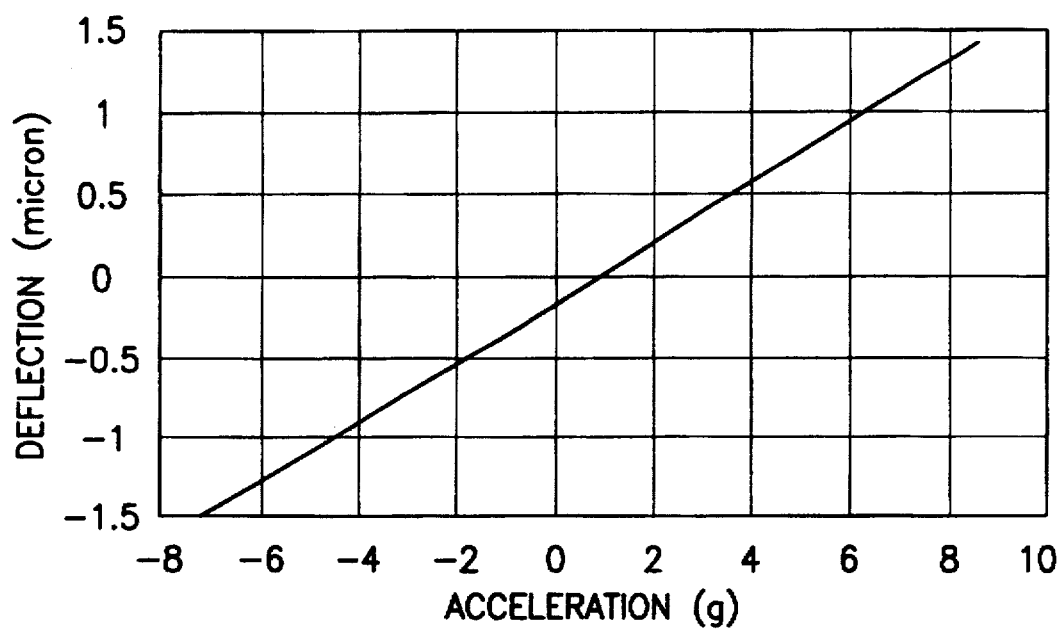
FIG. 10 is a plot of acceleration versus deflection for the microaccelerometer of FIG. 5, wherein the voltage of the ac levitating source is altered.
Figure 11:
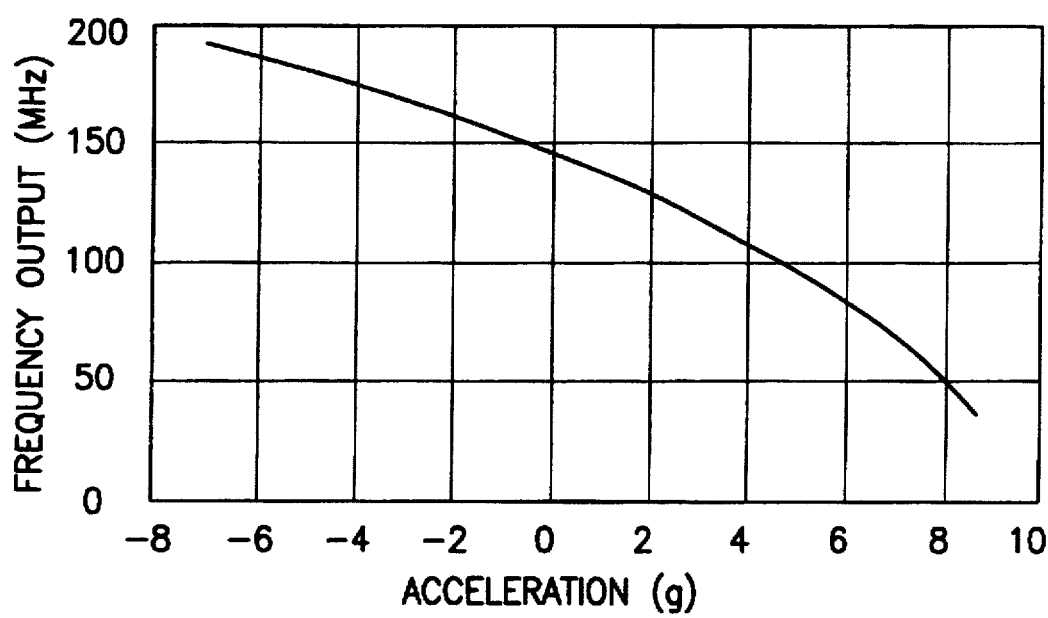
FIG. 11 is a plot of acceleration versus frequency output for the microaccelerometer of FIG. 5 wherein the voltage of the ac levitating source is altered.

FIG. 8 is a plot of acceleration versus deflection of seismic mass 18 of FIG. 5, employing a 5 volt, 200 MHz ac source 76. In FIG. 9, acceleration is plotted versus frequency for a 5 volt, 200 MHz ac source 76. FIGS. 10 and 11 are identical plots to those shown in FIGS. 8 and 9, however, the ac drive voltage has been reduced from 5 volts to 1 volt. This action reduces the levitation "stiffness", increases the sensitivity of the microaccelerometer by a factor of 5 and provides finer resolution.

Figure 12:
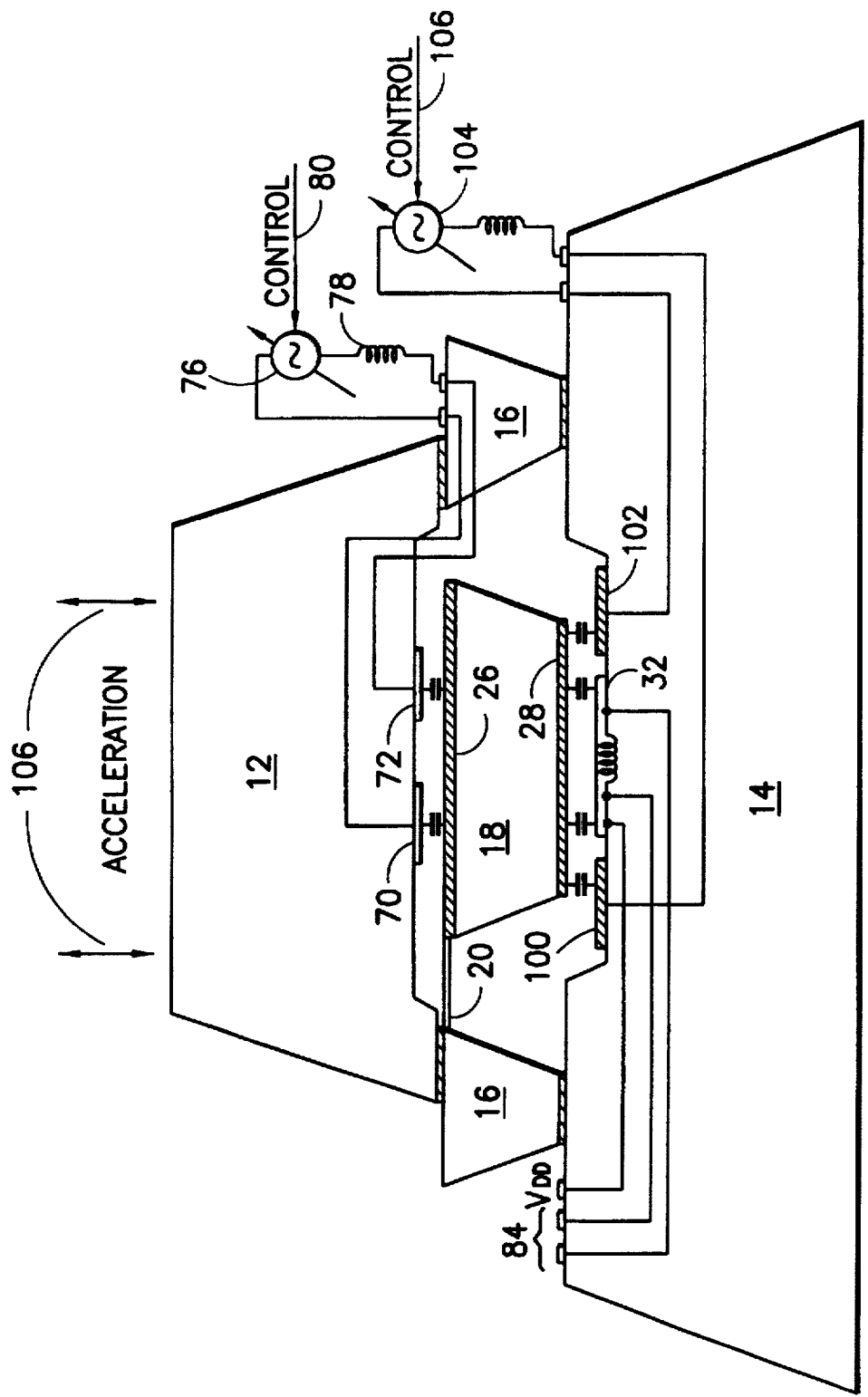
FIG. 12 is a third embodiment of a microaccelerometer incorporating the invention hereof.

Turning to FIG. 12, a microaccelerometer structure is shown that is substantially identical to that shown in FIG. 5, except that an additional pair of levitating plates 100 and 102 have been emplaced on the upper surface of support wafer 14 and are connected to a second source of ac levitating signal 104. Other components of the microaccelerometer of FIG. 12 are numbered identically to those shown in FIG. 5. The microaccelerometer of FIG. 12 is particularly adapted to sensing accelerations in the directions indicated by arrows 106.

As indicated with respect to FIG. 5, levitating plates 70 and 72, in combination with conductive layer 26, provide an attractive levitating force for seismic mass 18 when ac source 76 is energized. In a similar manner, levitating plates 100 and 102, in combination with conductive layer 28, provide an attractive force for seismic mass 18 when ac source 104 is energized. Thus, in the event of no acceleration, seismic mass 18 is positionally stable between cover wafer 12 and support wafer 14.

Figure 13:
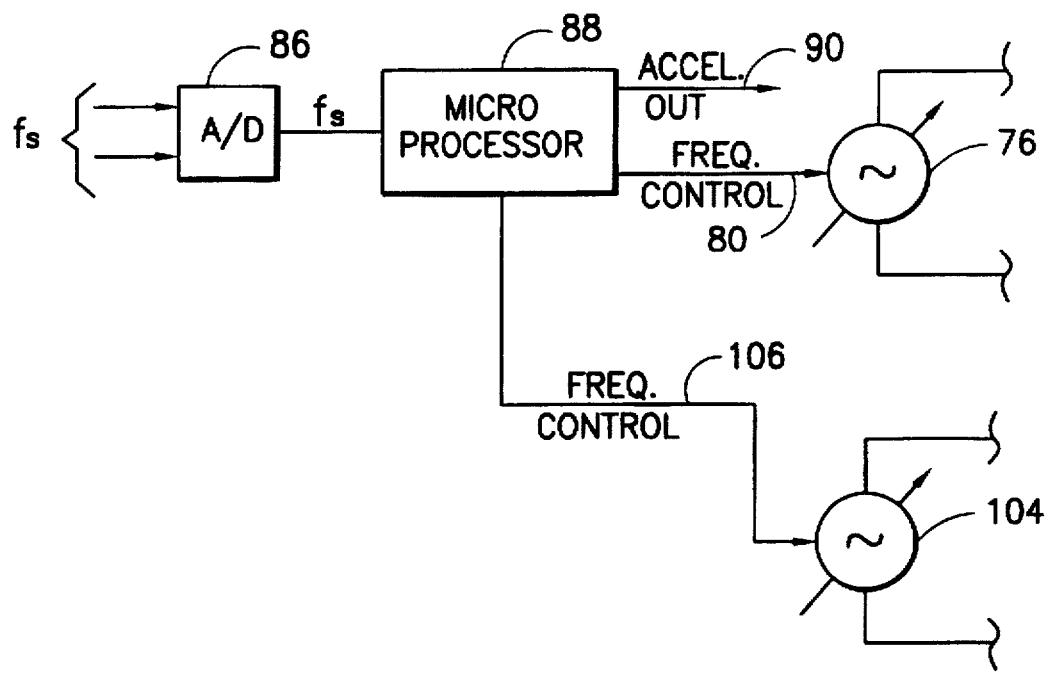
FIG. 13 is a feedback control circuit for use with the microaccelerometer of FIG. 12.

In the event of an acceleration, seismic mass 18 is displaced either towards or away from chip 32, thus causing a change in the oscillation signal frequency $f_r$ fed from chip 32. Signal $f_r$ is fed via output pads 84 to A/D converter 86 in FIG. 13. In a similar manner to that described for FIG. 6, a frequency difference between $f_r$ and the nominal oscillator frequency causes an acceleration output value to be impressed on output line 90 and a frequency control signal to be applied via control line 80 to ac source 76. In this case, microprocessor 88 includes an additional output frequency control line 106 that manifests an equal and opposite sense control signal on line 80. As a result, the frequency output of ac source 104 is altered in an opposite manner from that of ac source 76, thereby causing an equal and opposite sense changes in levitation forces applied to seismic mass 18. Seismic mass 18 is thus returned to a null position by the combined actions of levitating plates 70, 72 and 100, 102.

Figure 14:
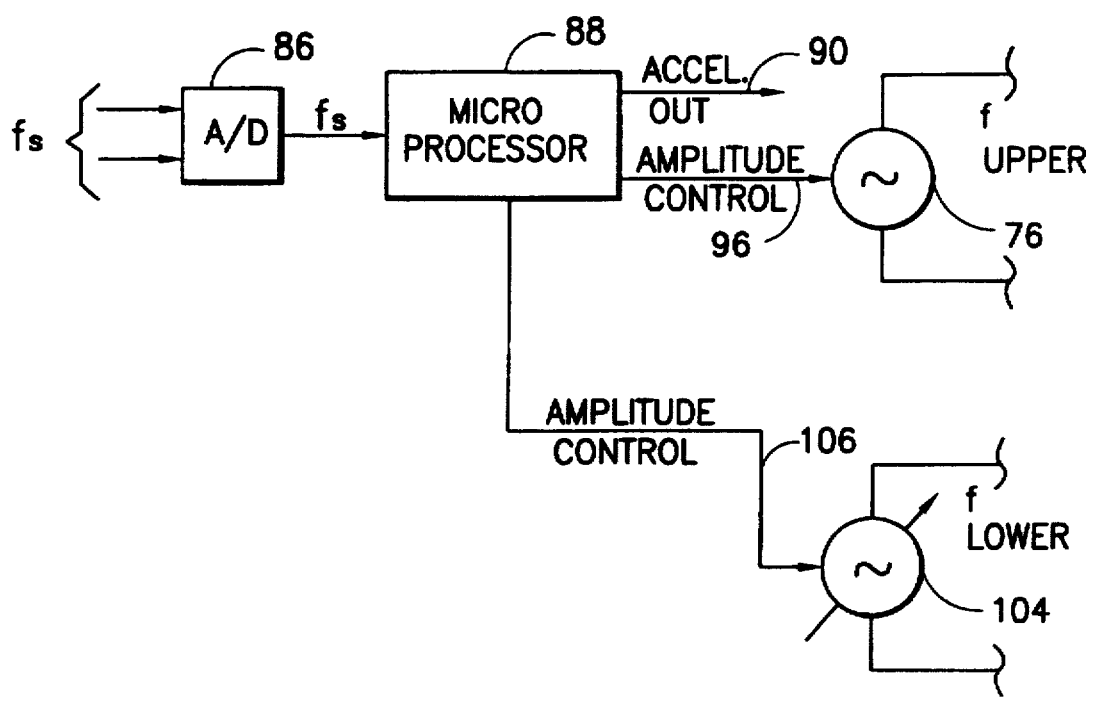
FIG. 14 is a further feedback control circuit for use with the microaccelerometer of FIG. 12.

In FIG. 14, a substantially identical control circuit is shown which, in lieu of modifying the frequency outputs of ac sources 76 and 104, modifies the amplitudes of their signal output in an equal and opposite direction so as to achieve a restoration of seismic mass 18 to a null position.

The microaccelerometer of FIG. 12 provides a sensitivity that is less dependent upon the stiffness of beam 20. Furthermore, by variation of the amplitude of control feedback signals to ac sources 76 and 104, the sensitivity of the microaccelerometer structure can be altered so as to accommodate different levels of acceleration.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. An accelerometer comprising:

a seismic mass having upper and lower surfaces;

a support wafer positioned below said lower surface of said seismic mass and having an upper surface separated from and opposed to the lower surface of said seismic mass;

a cover wafer positioned above said upper surface of said seismic mass and having a lower surface separated from and opposed to the upper surface of said seismic mass;

beam means for flexibly mounting said seismic mass between said support wafer and said cover wafer;

a first oscillator having a resonant circuit, including inductance and first capacitance, said first capacitance comprising a dielectric positioned between a conductive plate arrangement covering a substantial area of said upper surface of said seismic mass and a conductive plate arrangement on said lower surface of said cover wafer;

a second oscillator having a resonant circuit including inductance and second capacitance, said second capacitance comprising a dielectric positioned between a conductive plate arrangement covering a substantial area of said lower surface of said seismic mass and a conductive plate arrangement on said upper surface of said support wafer; and frequency difference means coupled to said first oscillator and said second oscillator for providing an output indicative of a difference in oscillation frequencies of said first and second oscillators when said accelerometer is subjected to an acceleration event that positionally displaces said seismic mass, said output of the difference in oscillation frequencies being a measure of said acceleration event.

2. The accelerometer of claim 1 wherein said first oscillator, including said inductance of said resonant circuit thereof, is positioned on said upper surface of said support wafer.

3. The accelerometer of claim 2 wherein said second oscillator, including said inductance of said resonant circuit thereof, is positioned on said lower surface of said cover wafer.

4. The accelerometer of claim 3 wherein composition of said cover wafer, said support wafer and said seismic mass is selected from a group comprising silicon and gallium arsenide compounds.

* * * * *